United States Patent
Eisen et al.

(10) Patent No.: US 7,278,011 B2
(45) Date of Patent: Oct. 2, 2007

(54) COMPLETION TABLE CONFIGURED TO TRACK A LARGER NUMBER OF OUTSTANDING INSTRUCTIONS WITHOUT INCREASING THE SIZE OF THE COMPLETION TABLE

(75) Inventors: Susan E. Eisen, Austin, TX (US); Hung Q. Le, Austin, TX (US); David A. Luick, Rochester, MN (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 10/821,054

(22) Filed: Apr. 8, 2004

(65) Prior Publication Data

US 2005/0228972 A1 Oct. 13, 2005

(51) Int. Cl.
*G06F 9/44* (2006.01)
(52) U.S. Cl. .................. 712/218; 712/233; 712/224
(58) Field of Classification Search ............... 712/233, 712/224, 218
See application file for complete search history.

(56) References Cited

U.S. PATENT DOCUMENTS 5,546,599 A * 8/1996 Song ........................ 712/23
6,134,645 A 10/2000 Nguyen ..................... 712/23
6,530,042 B1 3/2003 Davidson et al. .......... 714/47
6,553,480 B1 4/2003 Cheong et al. ............. 712/23
6,654,869 B1 * 11/2003 Kahle et al. ................ 712/24
6,751,709 B2 * 6/2004 Seidl et al. ................ 711/137

\* cited by examiner

*Primary Examiner*—Donald Sparks
*Assistant Examiner*—Vincent Lai
(74) *Attorney, Agent, or Firm*—Robert A. Voigt, Jr.; Winstead PC

(57) ABSTRACT

A method, completion table and processor for tracking a larger number of outstanding instructions. The completion table may include a plurality of entries where each entry tracks a consecutive number of outstanding instructions. Each entry may be configured to store an instruction address and an identification of a first of the consecutive number of outstanding instructions. By being able to track a consecutive number of outstanding instructions, such as the length of a cache line, in each entry in the completion table by only storing the instruction address and identification of the first of the consecutive number of outstanding instruction in that entry, the completion table may be able to track a larger number of outstanding instruction without increasing its size.

34 Claims, 5 Drawing Sheets

COMPLETION TABLE CONFIGURED TO TRACK A LARGER NUMBER OF OUTSTANDING INSTRUCTIONS WITHOUT INCREASING THE SIZE OF THE COMPLETION TABLE

TECHNICAL FIELD

The present invention relates to the field of microprocessors, and more particularly to a completion table configured to track a larger number of outstanding instructions.

BACKGROUND INFORMATION

Microprocessors are classified as superscalar if the microprocessor ("processor") is capable of completing multiple instructions per clock cycle. The architecture of a superscalar processor utilizes multiple parallel processing units within the processor to allow completion of more multiple instructions per clock cycle. These processing units generally include multiple execution units operating in parallel, a dispatch unit for sending instructions and data to the execution units, and rename buffers (rename registers) for pre-loading instructions for the execution units. These processing units may further include a completion unit containing a ("completion table") for tracking and retiring the instructions. For example, the completion unit may keep track of when instructions have been "completed". An instruction may be said to be "completed" when it has been executed and is at a stage where any exception will not cause the reissuance of this instruction.

In a typical superscalar processor, multiple instructions are retrieved from an instruction cache and placed in a queue, commonly referred to as an instruction queue. After entering the instruction queue, instructions are issued to various execution units by the dispatch unit. Upon executing the received instructions, the execution units may transmit an indication to the completion unit indicating the execution of the received instruction. This information may be stored in the completion table. The completion unit then completes, or retires, the instruction and sends a completion signal to the remaining execution units, allowing write-back of finished data into architected registers.

The size of the completion table corresponds to the number of outstanding instructions to be tracked. For example, the greater the number of outstanding instructions to be tracked, the greater the size of the completion table. However, the greater the size of the completion table, the more power is consumed and the greater amount of silicon area is used. While a smaller completion table reduces the silicon area and power, fewer outstanding instructions are tracked which may reduce performance.

Therefore, there is a need in the art for a completion table to track a larger number of outstanding instructions without increasing its size.

SUMMARY

The problems outlined above may at least in part be solved in some embodiments by being able to track a consecutive number of outstanding instructions, such as the length of a cache line, in each entry in the completion table by only storing the effective address and identification ("ITAG") of the first of the consecutive number of outstanding instructions in that entry. The completion table may consequently be able to track a larger number of outstanding instructions without increasing its size.

In one embodiment of the present invention, a method for tracking a larger number of outstanding instructions in a completion table may comprise the step of issuing instructions to a first and a second execution unit. The method may further comprise selecting an identification of either an instruction finished or an instruction active at either the first and second execution unit. The method may further comprise calculating an identification of a next to complete instruction using the identification of the selected instruction. The method may further comprise selecting an instruction address and an identification of a first of a consecutive number of outstanding instructions located in an entry of the completion table. The method may further comprise calculating an instruction address of the next to complete instruction using the identification of the next to complete instruction and the selected instruction and identification of the first of the consecutive number of outstanding instructions located in the entry of the completion table.

In another embodiment of the present invention, a completion table may comprise a plurality of entries where each of the plurality of entries tracks a consecutive number of outstanding instructions. Further, each of the plurality of entries may be configured to store an instruction address and an identification of a first of a consecutive number of outstanding instructions.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, completion table and processor for tracking a larger number of outstanding instructions in a completion table. In one embodiment of the present invention, the completion table may include a plurality of entries where each entry tracks a consecutive number of outstanding instructions. Each entry may be configured to store an instruction address and an identification of a first of the consecutive number of outstanding instructions. By being able to track a consecutive number of outstanding instructions, such as the length of a cache line, in each entry in the completion table by only storing the instruction address and identification of the first of the consecutive number of outstanding instruction in that entry, the completion table may be able to track a larger number of outstanding instruction without increasing its size.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
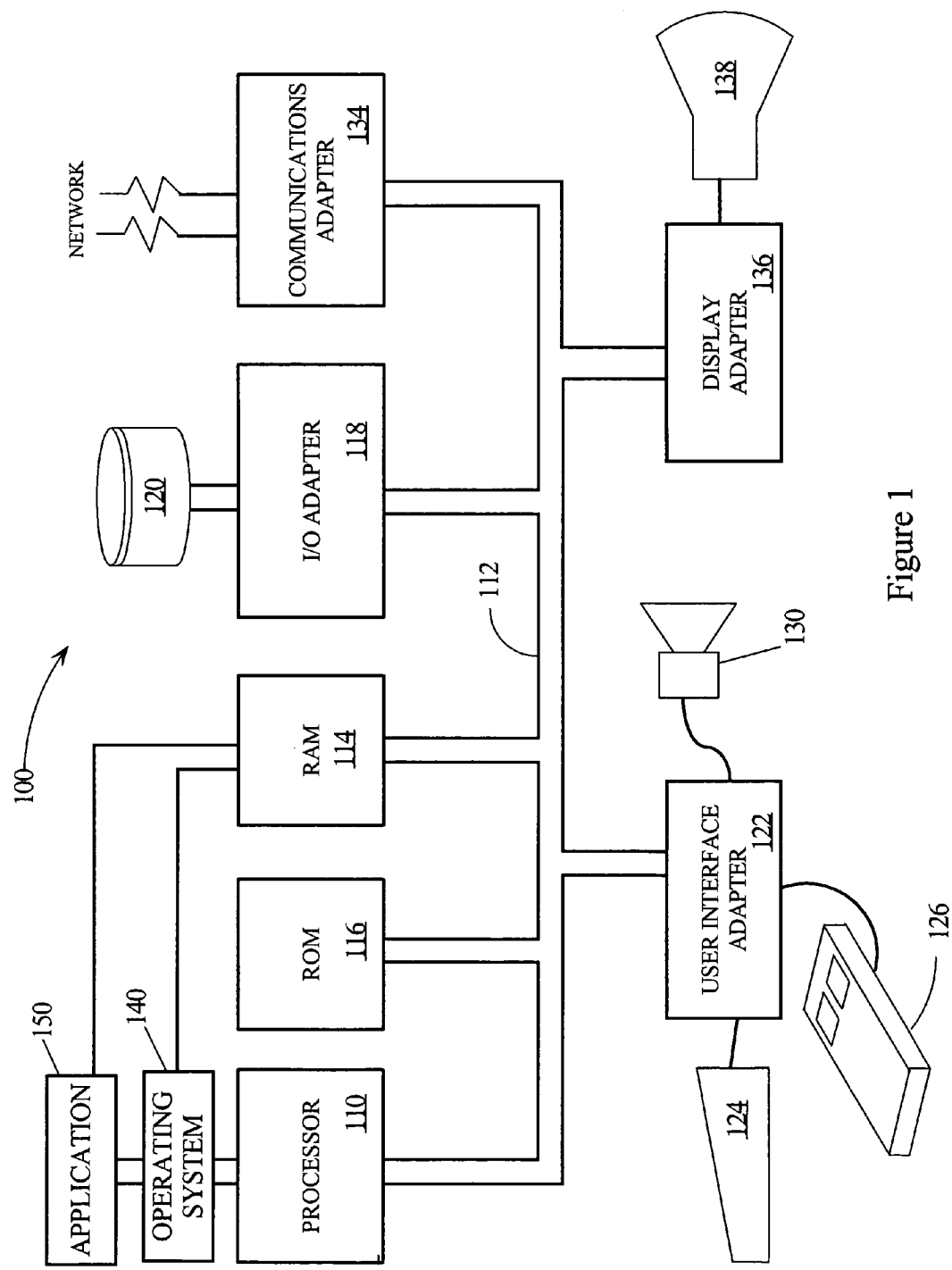
FIG. 1 illustrates an embodiment of the present invention of a computer system.

FIG. 1—Computer System

FIG. 1 illustrates a typical hardware configuration of computer system 100 which is representative of a hardware environment for practicing the present invention. Computer system 100 may have a processor 110 coupled to various other components by system bus 112. A more detail description of processor 110 is described below in conjunction with FIG. 2. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114 which may be computer system's 100 main memory for execution. Disk adapter 118 may be an integrated drive electronics ("IDE") adapter that communicates with a disk unit 120, e.g., disk drive.

Referring to FIG. 1, computer system 100 may further comprise a communications adapter 134 coupled to bus 112. Communications adapter 134 may interconnect bus 112 with an outside network enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138 or speaker 130.

FIG. 2—Processor

Figure 2:
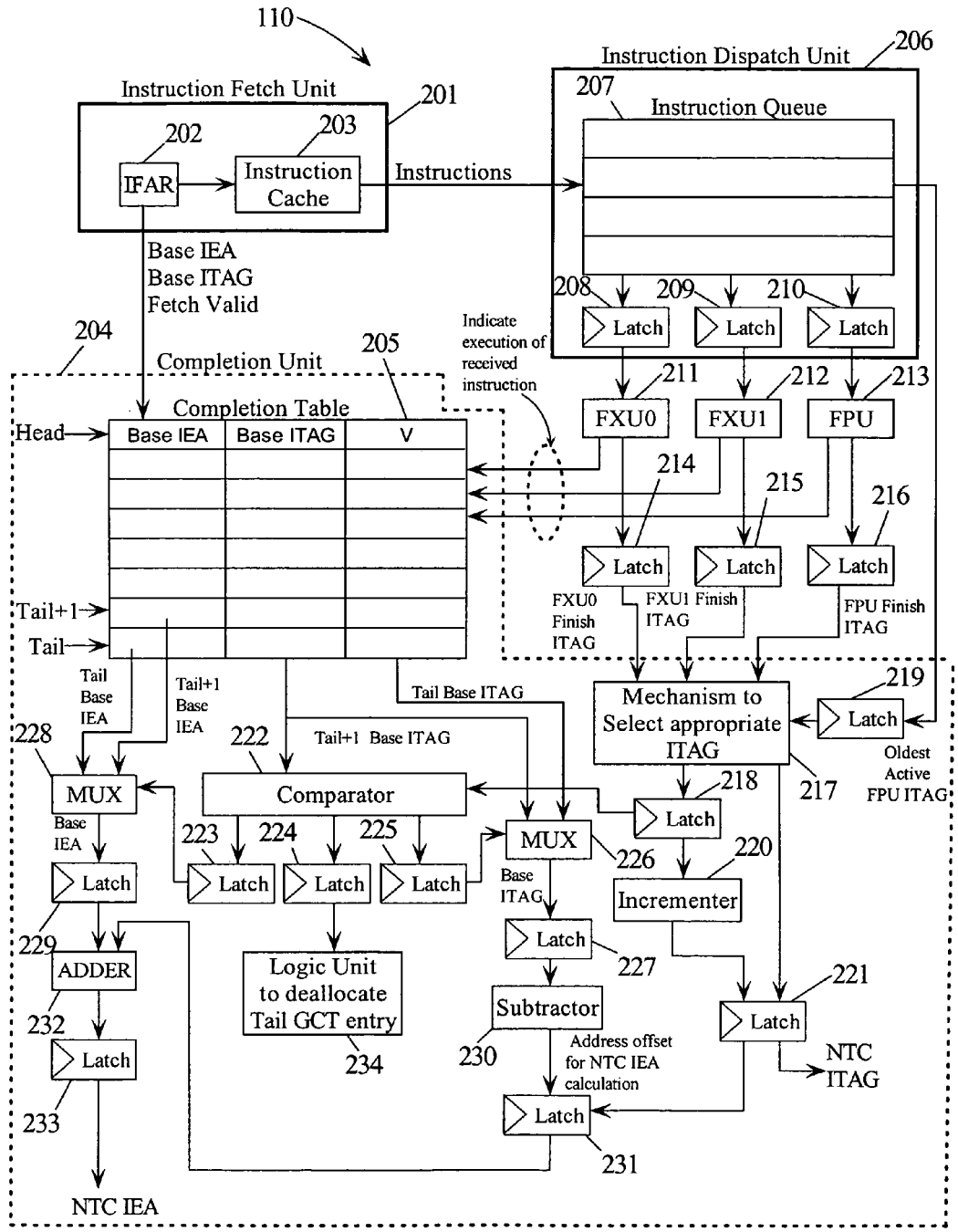
FIG. 2 illustrates an embodiment of the present invention of a processor.

FIG. 2 illustrates an embodiment of processor 110 (FIG. 1). Processor 110 may comprise an instruction fetch unit 201. Instruction fetch unit 201 may include an Instruction Fetch Address Register (IFAR) 202 and an instruction cache 203. Instruction fetch unit 201 may be configured to fetch an instruction, such as from a program counter in a multithreading system, as well as load the address of the fetched instruction in IFAR 202. The address loaded into IFAR 202 may be an effective address representing an address from the program or compiler. The instruction corresponding to the received effective address may be stored in instruction cache 203.

Instruction fetch unit 201 may further be configured to issue the effective address of the fetched instruction, an identification (referred to herein as an "ITAG") associated with the fetched instruction and an indication as to whether the fetched instruction is valid to a completion unit 204 coupled to instruction fetch unit 201. An ITAG may refer to a smaller number of bits, e.g., 8-bits, used to identify a particular instruction of a longer length, e.g., 64-bit address, in a cache line, e.g., 32 instructions in a cache line, in a particular entry, e.g., 8 entries, in a completion table (as discussed further below).

Completion unit 204 may be configured to keep track of when the fetched instructions have been "completed". "Completed", as used herein, may refer to an instruction that has been executed by an execution unit and is at a stage where any exception will not cause the reissuance of that instruction. Completion unit 204 may keep track of when an instruction has been completed by including a table 205, referred to herein as a "completion table". Completion table 205 may include a plurality of entries. Each entry in completion table 205 may be configured to keep track of a consecutive number of outstanding instructions. In one embodiment, each entry may be configured to track a consecutive number of outstanding instructions equal to the length of a cache line, e.g., 32 instructions.

Referring to FIG. 2, each entry in completion table 205 may be configured to store the effective address of the first instruction of a consecutive number of outstanding entries, e.g., 32 consecutive instructions. This effective address is referred to herein as the "Base Instruction Effective Address (Base IEA)". Each entry in completion table 205 may further be configured to store an ITAG of this first instruction referred to herein as the "Base ITAG". Each entry in completion table 205 may further be configured to store an indication as to whether this first instruction is valid indicated by "V" in completion table 205. By being able to track a consecutive number of outstanding instructions, such as the length of a cache line, in each entry in the completion table by only storing the effective address and identification ("ITAG") of the first of the consecutive number of outstanding instructions in that entry, the completion table may be able to track a larger number of outstanding instructions without increasing its size.

Referring to FIG. 2, processor 110 may further include an instruction dispatch unit 206 coupled to instruction fetch unit 201. Instruction dispatch unit 206 may be configured to receive instructions issued from instruction cache 203. These instructions may be stored in a queue 207 in instruction dispatch unit 206, referred to herein as the "instruction queue". Instruction queue 207 may include "N" entries to store a total of N instructions. Instruction dispatch unit 206 may be configured to dispatch the instructions stored in instruction queue 207 to the appropriate execution units, e.g., floating point units, fixed point units, load/store unit, branch execution unit, during any clock cycle. Prior to dispatching the instructions, the instructions may be stored in an appropriate latch 208-210 to be dispatched to the appropriate execution unit 211-213. For example, a fixed point instruction may be stored in latch 208 to later be dispatched to a fixed point execution unit "FXU", such as "FXU0" 211. Alternatively, a fixed point instruction may be stored in latch 209 to later be dispatched to a fixed point execution unit "FXU", such as "FXU1" 212. In another example, a floating point instruction may be stored in latch 210 to later be dispatched to a floating point execution unit "FPU" 213. It is noted that processor 110 may include additional execution units (additional in number and type) than illustrated and that FIG. 2 is illustrative.

Upon completion of executing the instruction, execution units 211-213 transmit an indication to completion unit 204 indicating that the instruction is "finished." "Finished" as used herein may refer to an instruction that has finished execution by the appropriate execution unit. Execution units 211-213 may place an identification ("ITAG") of the finished instruction in latches 214-216, respectively.

Figure 3A:
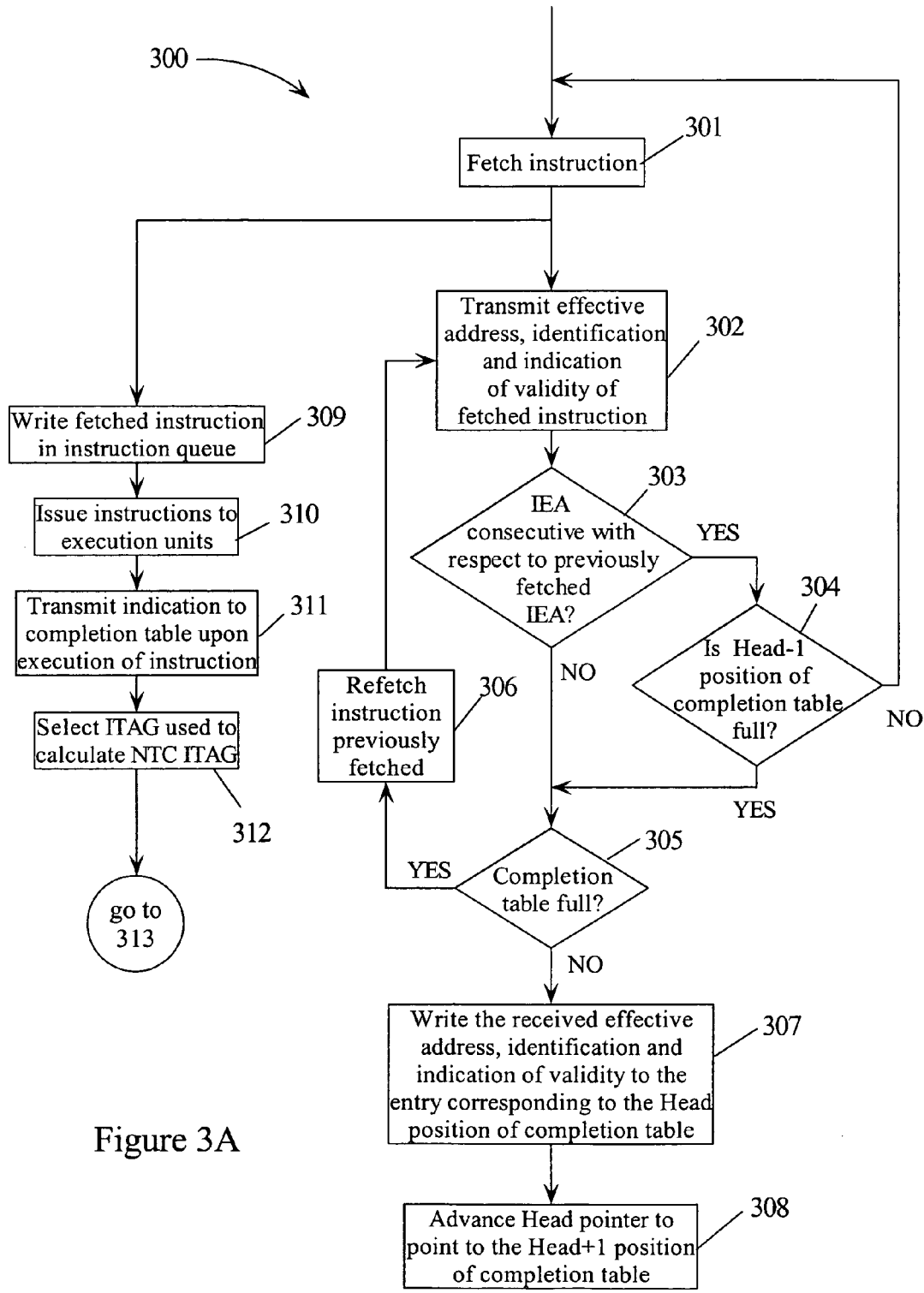
FIG. 3 is a flowchart of a method for calculating the effective address and identification of the next to complete instruction in accordance with an embodiment of the present invention.
Figure 3B:
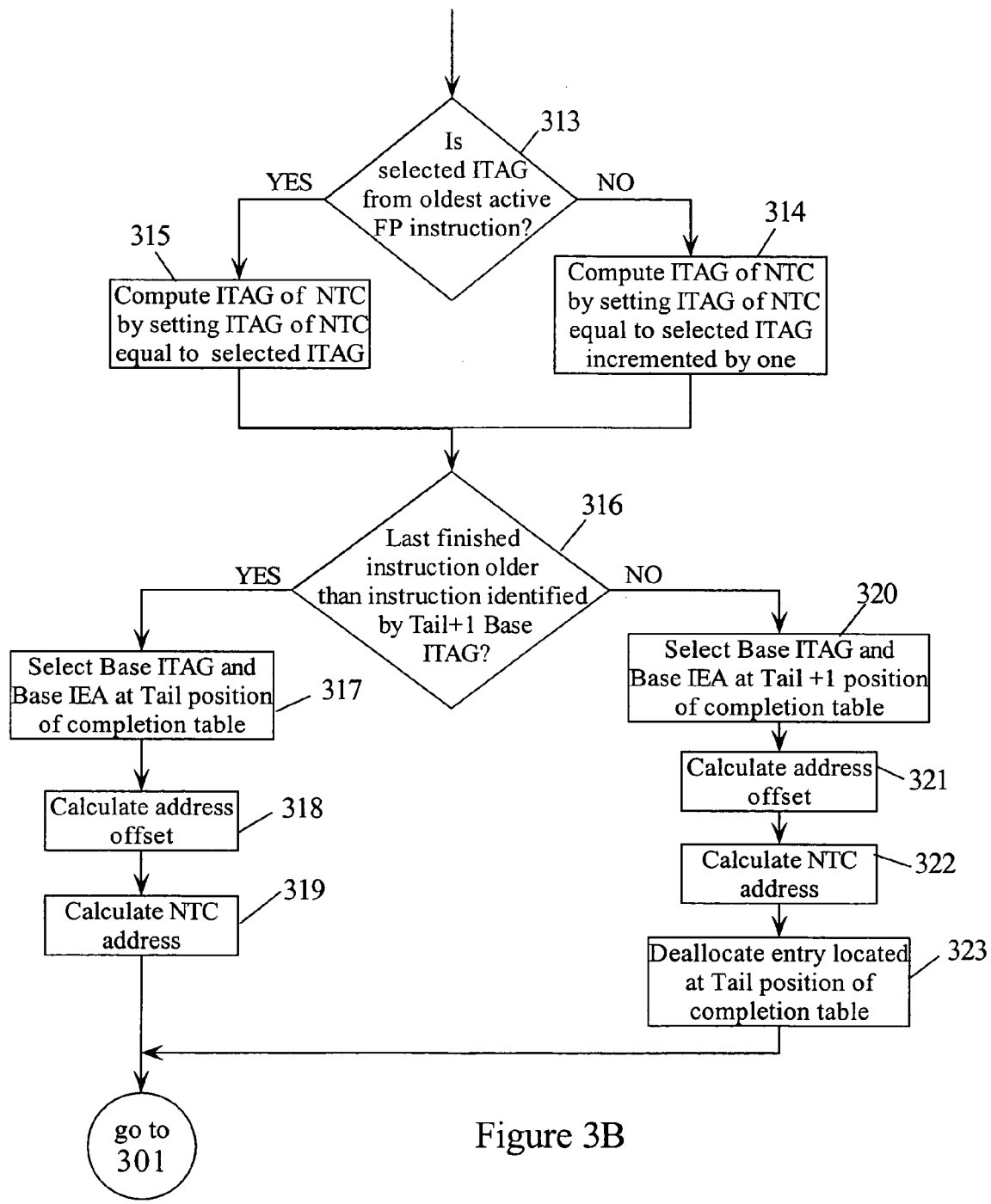
Figure 4:
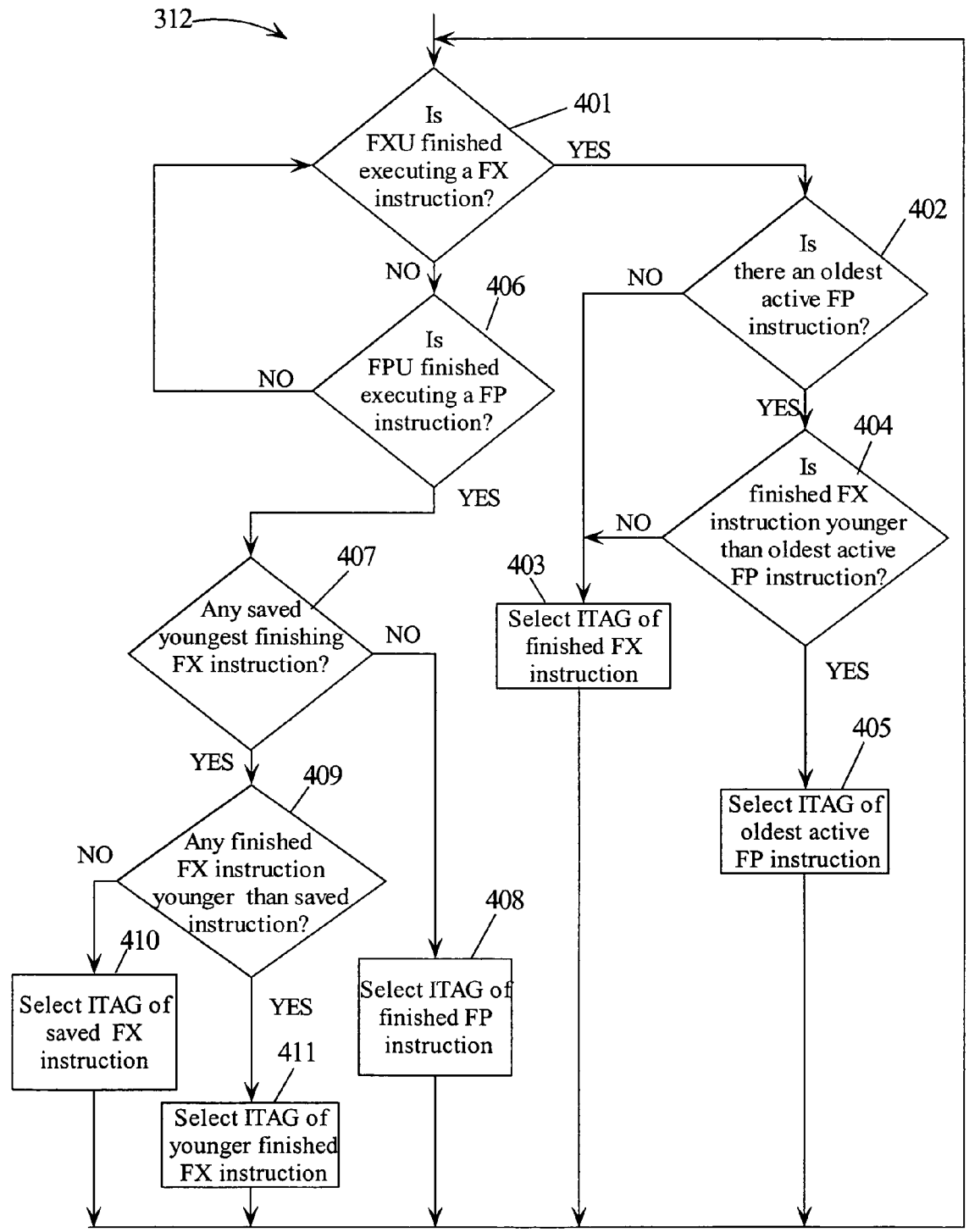
FIG. 4 is a flowchart of a method for selecting the identification of an appropriate instruction used to calculate the identification of the next to complete instruction for an out-of-order processor in accordance with an embodiment of the present invention.

The remaining elements of processor 110 will be discussed in conjunction with FIGS. 3 and 4 as discussed below. FIG. 3 is a flowchart of a method for calculating the effective address and identification of the next to complete instruction in accordance with an embodiment of the present invention. FIG. 4 is a flowchart of a method for selecting the identification of an instruction used to calculate the identification of the next to complete instruction for an out-of-order processor in accordance with an embodiment of the present invention.

In one embodiment, processor 110 may be an in-order processor which may be refer to executing instructions of the same type, e.g., fixed point instructions, at the same time if they were dispatched in the same cycle. In an alternative embodiment, processor 110 may be an out-of-order processor which may be refer to executing instructions of different types, e.g., fixed and floating point instructions, in a different order than they were dispatched. For example, floating point instructions in general take longer to execute than fixed point instructions. Thus, if these two types of instructions were to be dispatched in the same cycle, a fixed point instruction may be "finished" prior to a floating point instruction. "Finished", as used herein, may refer to an instruction that has finished execution by the appropriate execution unit. To maintain an in-order between the fixed point unit and floating point unit pipes (referring to stream of instructions to be executed), the next dispatch group (referring to the next group of instructions to be dispatched by instruction dispatch unit 206) may have to be stalled at dispatch and wait for the floating point unit to finish execution. However, in order to improve performance, it may be desirable to dispatch a stream of fixed point instructions every cycle, even after a floating point instruction was dispatched. When this happens, many fixed point instructions that are younger (referring to being more recently dispatched by instruction dispatch unit 206) than the floating point instruction will have finished by the time the older (referring to being dispatched earlier by instruction dispatch unit 206) floating point instruction is finished. Hence, the floating point instruction may finish out-of-order with respect to the fixed point instructions.

As stated above, completion unit 204 may use completion table 205 to keep track of when the fetched instructions have been completed. In one embodiment, completion unit 204 may keep track of when the fetched instructions have been completed by tracking the instruction, referred to herein as the "next to complete instruction." The next to complete instruction may refer to the instruction that is the next instruction to be completed by completion unit 204.

As stated in the Background Information section, the size of the completion table corresponds to the number of outstanding instructions to be tracked. For example, the greater the number of outstanding instructions to be tracked, the greater the size of the completion table. However, the greater the size of the completion table, the more power is consumed and the greater amount of silicon area is used. While a smaller completion table reduces the silicon area and power, fewer outstanding instructions are tracked which may reduce performance. Therefore, there is a need in the art for a completion table to track a larger number of outstanding instructions without increasing its size. In one embodiment, a completion table may be able to track a larger number of outstanding instructions by being able to track a consecutive number of outstanding instructions in each entry in the completion table by only storing the effective address and identification ("ITAG") of the first of the consecutive number of outstanding instructions. Completion unit 204 may track the completion of each instruction in the consecutive number of outstanding instructions for each entry in completion table 205 by tracking the status of the next to complete instruction. In order to track the status of the next to complete instruction, completion unit 206 may have to determine the effective address and identification of the next to complete instruction. Completion unit 206 may determine the effective address and identification of the next to complete instruction for an in-order processor using the method described in FIG. 3 or an out-of-order processor using the methods described in FIGS. 3 and 4.

FIG. 3—Method for Calculating the Effective Address and Identification of the Next to Complete Instruction FIG. 3 is a flowchart of one embodiment of the present invention for calculating the effective address and identification of the next to complete instruction.

Referring to FIG. 3, in conjunction with FIG. 2, in step 301, instruction fetch unit 201 fetches an instruction. In step 302, instruction fetched unit 201 transmits the effective address ("IEA") and identification ("ITAG") of the fetched instruction as well as an indication as to the validity of the fetched instruction to completion unit 204.

In step 303, completion unit 204 determines if the received IEA is consecutive with respect to a previously fetched IEA. That is, completion unit 204 determines if the effective address of the fetched instruction is the following effective address of the previously fetched instruction.

If the effective address of the fetched instruction is the following effective address of the previously fetched instruction, then, in step 304, completion unit 204 determines if the "Head−1" position of completion table 205 is full. The "Head−1" position may refer to the entry in completion table 205 recently filled with the effective address and identification of a first of a consecutive number of outstanding instructions as well as an indication as to the validity of the instruction. The "Head" position may refer to the following entry, i.e., the entry to be filled.

If the "Head−1" position of completion table 205 is not full, then instruction fetch unit 201 fetches another instruction in step 301. It is noted that instruction fetch unit 201 may fetch the next instruction during or after the completion of any step in method 300 and that fetching another instruction if the "Head−1" position of completion table 205 is not full is illustrative.

If, however, the "Head−1" position of completion table 205 is full or if the effective address of the fetched instruction is not the following effective address of the previously fetched instruction, then, in step 305, completion unit 204 determines if completion table 205 is full.

If completion table 205 is full, then instruction fetch unit 201 refetches the instruction (referring to the instruction fetched in step 301) in step 306. Upon refetching the instruction in step 306, instruction fetched unit 201 transmits the effective address ("IEA") and identification ("ITAG") of the fetched instruction as well as an indication as to the validity of the fetched instruction to completion unit 204 in step 302.

If completion table 205 is not full, then, in step 307, completion unit 204 writes the received effective address, identification and indication of validity in the entry of completion table 205 corresponding to the "Head" position. Since the received effective address of the fetched instruction is not the following effective address of the previously fetched instruction, the fetched instruction may be a first instruction of a next group of consecutive outstanding instructions such as in the following cache line.

In step 308, completion unit 204 advances the "Head" pointer to point to the "Head+1" position corresponding to the next empty location. In one embodiment, completion unit 204 may be configured to use a pointer to point to the next empty entry in completion table 205.

Referring to step 301, after instruction fetch unit 201 fetches an instruction, in step 309, instruction fetch unit 201 writes the fetched instruction in instruction queue 207. In step 310, instruction dispatch unit 206 issues instructions stored in instruction queue 207 to one or more of execution units 211-213. In step 311, execution unit 211, 212 or 213 transmits an indication to completion unit 204 upon execution of an instruction.

In step 312, completion unit 204 selects the identification ("ITAG") of an instruction currently being executed by execution unit 211, 212 or 213 or an instruction finished by execution unit 211, 212 or 213 where the selected ITAG may be used for calculating the identification ("ITAG") of the next to complete instruction as described below.

In the embodiment of an in-order processor, completion unit 204 receives the identification ("ITAG") of the most recently finished instruction, i.e., the last instruction finished. The received identification of the last instruction finished corresponds to the identification selected by mechanism 217 of completion unit 204 to compute the identification of the next to complete instruction as discussed below. In one embodiment, the identification ("ITAG") of the finished instruction that is stored in latch 214, 215 or 216 may be transmitted to mechanism 217 which may then be stored in latch 218 of completion unit 204. In the embodiment of processor 110 being an in-order processor, completion unit 204 may not include latch 219 configured to store an oldest active floating point instruction. Latch 219 may be used in an out-of-order processor as discussed further below in conjunction with FIG. 4. In the embodiment of processor 110 being an out-of-order processor, mechanism 217 may be configured to select the ITAG from either latch 214, 215, 216 or 219 to calculate the ITAG of the next to complete instruction as described below. If mechanism 217 selects the ITAG from latch 219 ("oldest active floating point instruction" as explained below), then the selected ITAG is stored in latch 221 and not in latch 218 as described below.

In the embodiment of an out-of-order processor, mechanism 217 of completion unit 204 selects the identification ("ITAG") of an instruction currently being executed by execution unit 211, 212 or 213 or an instruction finished by execution unit 211, 212 or 213 as described below in conjunction with FIG. 4. It is noted that FIG. 4 describes step 312 for an out-of-order processor in which fixed point instructions and floating point instructions may be executed out of order as described above. It is further noted that these are illustrative and that FIG. 4 may apply to any two different types of instructions that may be executed out of order.

Prior to discussing FIG. 4, a discussion on four possible scenarios on the order that fixed point instructions and floating point instructions are executed is deemed appropriate.

A first possible scenario is when fixed point instructions and floating point instructions are finished at the same time. For example, suppose instructions $FX_0$, $FX_1$, $FX_2$, $FP_1$ and $FX_4$ are dispatched in the same cycle by instruction dispatch unit 206 and finished at the same time. In this scenario, the identification ("ITAG") of the floating point instruction $FP_1$ is selected to calculate the identification ("ITAG") of the next to complete instruction. The identification ("ITAG") of the floating point instruction $FP_1$ may be selected, in part, because floating point instructions in general take longer to execute than fixed point instructions. Consequently, the next to complete instruction may likely be the next floating point instruction.

A second possible scenario is if there are no floating point instructions finishing (execution of floating point instructions by floating point units, such as floating point unit 213, is not completing) and a fixed point instruction has recently finished. The recently finished fixed point instruction may then be compared with the oldest active floating point instruction (referring to the earliest dispatched floating point instruction that has not finished but currently being executed by a floating point unit). If the youngest finishing fixed point instruction (most recent fixed point instruction finished) is older than the oldest active floating point instruction, then the ITAG of the youngest finishing fixed point instruction is selected to calculate the ITAG of the next to complete instruction. For example, suppose instructions $FX_0$, $FX_1$ and $FP_1$ are dispatched in the same cycle by instruction dispatch unit 206 in the order indicated above. Fixed point instruction $FX_0$ finishes followed by fixed point instruction $FX_1$. Floating point instruction $FP_1$ is still active. In this scenario, the identification ("ITAG") of fixed point instruction $FX_1$ is selected to calculate the identification ("ITAG") of the next to complete instruction. The identification ("ITAG") of the floating point instruction $FX_1$ may be selected, in part, because it is the oldest instruction that has finished. In the above scenario, the next to complete instruction would be $FP_1$. The ITAG of $FP_1$ may be determined using the ITAG of the next to complete instruction as discussed below.

A third possible scenario is if there are no floating point instructions finishing (execution of floating point instructions by floating point units, such as floating point unit 213, is not completing) and a fixed point instruction has recently finished. The recently finished fixed point instruction may then be compared with the oldest active floating point instruction (referring to the earliest dispatched floating point instruction that has not finished but currently being executed by the floating point unit). If the youngest finishing fixed point instruction (most recent fixed point instruction finished) is younger than the oldest active floating point instruction, then the ITAG of the oldest active floating point instruction is selected to calculate the ITAG of the next to complete instruction. For example, suppose instructions $FX_0$, $FP_1$ and $FX_1$ are dispatched in the same cycle by instruction dispatch unit 206 in the order indicated above. Fixed point instruction $FX_0$ finishes followed by fixed point instruction $FX_1$. In this scenario, the identification ("ITAG") of floating point instruction $FP_1$ is selected to calculate the identification ("ITAG") of the next to complete instruction. Under this scenario, the ITAG of floating point instruction $FP_1$ is the ITAG of the next to complete instruction. The identification ("ITAG") of the floating point instruction $FP_1$ may be selected, in part, because floating point instructions in general take longer to execute than fixed point instructions and it is the oldest active floating point instruction. In this scenario, the ITAG of $FP_1$ is selected to be the ITAG of the next to complete instruction. Furthermore, the ITAG of the youngest finishing fixed point instruction (referring to the most recently finished fixed point instruction) may be saved. The saved fixed point instruction may be used in the following scenario.

A fourth possible scenario is when the oldest active floating point instruction is finished and if there are no older floating point instructions in the pipe (referring to the stream of floating point instructions dispatched in a cycle), then the ITAG of the saved youngest fixed point instruction is selected to calculate the ITAG of the next to complete instruction assuming that there are no younger fixed point instructions that have finished. If there are any younger fixed point instructions that have finished than the saved fixed point instruction, then the ITAG of that younger fixed point instruction is selected to calculated calculate the ITAG of the next to complete instruction. For example, referring to the example in the third scenario, when floating point instruction $FP_1$ is finished, then the ITAG of the saved fixed point instruction ($FX_1$ in the example) is used to calculate the ITAG of the next to complete instruction unless a younger fixed point instruction has finished. The identification ("ITAG") of the saved or possibly younger floating point instruction may be selected, in part, because it is the oldest instruction that has finished. The ITAG of the next to complete instruction may then be determined using the ITAG of the saved or possibly younger floating point instruction.

Mechanism 217 of processor 110 may be configured to select the appropriate ITAG to calculate the ITAG of the next to complete instruction in the four scenarios described above using the method described below in conjunction with FIG. 4.

Referring to FIG. 4, in conjunction with FIG. 2, in step 401, completion unit 204 determines if fixed point unit 211, 212 finished executing a fixed point instruction.

If fixed point unit 211, 212 has finished executing a fixed point instruction, then, in step 402, completion unit 204 determines if there is an oldest active floating point instruction. If there is no oldest active floating point instruction, then, in step 403, completion unit 204 selects the identification ("ITAG") of the fixed point instruction finished.

If, however, there is an oldest active floating point instruction (stored in latch 219), then, in step 404, completion unit 204 determines if the fixed point instruction that finished is younger than the oldest active floating point instruction.

If the fixed point instruction that finished is not younger than the oldest active floating point instruction, then, in step 403, completion unit 204 selects the identification ("ITAG") of the fixed point instruction finished to compute the ITAG of the next to complete instruction. Completion unit 204 then determines if fixed point unit 211, 212 has finished executing a fixed point instruction in step 401.

If, however, the fixed point instruction that finished is younger than the oldest active floating point instruction, then, in step 405, completion unit 204 selects the oldest active floating point instruction as the ITAG to compute the ITAG of the next to complete instruction. As stated above, under this scenario, the ITAG of the oldest active floating point instruction is the ITAG of the next to complete instruction. Completion unit 204 then determines if fixed point unit 211, 212 has finished executing a fixed point instruction in step 401.

Returning to step 401, if fixed point unit 211, 212 has not finished executing a fixed point instruction, then, in step 406, completion unit 204 determines if floating point unit 213 has finished executing an instruction. If floating point unit 213 has not finished executing a floating point instruction, then completion unit 204 determines if fixed point unit 211, 212 has finished executing a fixed point instruction in step 401.

If, however, floating point unit 213 has finished executing a floating point instruction, then, in step 407, completion unit 204 determines if there are any saved fixed point instructions (referring to the youngest finishing fixed point instruction).

If there is no saved fixed point instruction, then, in step 408, completion unit 204 selects the ITAG of the finished floating point instruction as the ITAG to determine the ITAG of the next to complete instruction. Completion unit 204 then determines if fixed point unit 211, 212 has finished executing a fixed point instruction in step 401.

If, however, there is a save fixed point instruction, then, in step 409, completion unit 204 determines if there are any younger finished fixed point instruction than the saved fixed point instruction. If there are no younger finished fixed point instruction than the saved fixed point instruction, then, in step 410, completion unit 204 selects the ITAG of the saved fixed point instruction as the ITAG to determine the ITAG of the next to complete instruction. Completion unit 204 then determines if fixed point unit 211, 212 has finished executing a fixed point instruction in step 401.

If, however, there is a younger finished fixed point instruction than the saved fixed point instruction, then, in step 411, completion unit 204 selects the ITAG of the younger finished fixed point instruction as the ITAG to determine the ITAG of the next to complete instruction. Completion unit 204 then determines if fixed point unit 211, 212 has finished executing a fixed point instruction in step 401.

Returning to FIG. 3, in step 313, completion unit 204 determines if the selected ITAG is the ITAG of the oldest active floating point instruction. In one embodiment, mechanism 217 contains logic to determine if the selected ITAG is the ITAG of the oldest active floating point instruction.

If the selected ITAG is not the ITAG of the oldest active floating point instruction, then completion unit 204 may calculate the identification of the next to complete instruction by adding the logical value of "1" to the identification ("ITAG") of the identification selected in step 314. In one embodiment, completion unit 204 may calculate the identification of the next to complete instruction by incrementer 220 incrementing the selected identification ("ITAG") by a logical value of one and storing the result in latch 221. Latch 221 may be configured to store the ITAG of the next to complete instruction.

If, however, the selected ITAG is the ITAG of the oldest active floating point instruction, then completion unit 204 may calculate the identification of the next to complete instruction by having the selected ITAG (ITAG of the oldest active floating point instruction) be the ITAG of the next to complete instruction in step 315. In one embodiment, mechanism 217 may be configured to store the selected ITAG (ITAG of the oldest active floating point instruction) in latch 221.

In step 316, completion unit 204 determines if the selected instruction (referring to the instruction identified by the ITAG selected by mechanism 217) is older than the instruction corresponding to the first of a consecutive number of outstanding instructions in the "Tail+1" position of completion table 205. The "Tail" position may refer to the oldest entry in completion table 205. The "Tail+1" position may refer to the next oldest entry. In one embodiment, completion unit 204 may determine if the last finished instruction is older than the instruction corresponding to the first of a consecutive number of outstanding instructions in the "Tail+1" position of completion table 205 by comparator 222 comparing the Base ITAG in the Tail+1 position with the ITAG of the selected instruction. The results of the comparison may be stored in latches 223, 224 and 225.

If the selected instruction is older than the instruction corresponding to the first of a consecutive number of outstanding instructions in the "Tail+1" position of completion table 205, then, in step 317, completion unit 204 selects the Base ITAG and Base EA in the entry at the Tail position of completion table 205. If the selected instruction is older than the instruction corresponding to the first of a consecutive number of outstanding instructions in the "Tail+1" position of completion table 205, then the selected instruction corresponds to one of the instructions represented in the Tail position of completion table 205. In one embodiment, completion unit 204 may select the Base ITAG in the entry at the Tail position of completion table 205 by inputting the Base ITAG from both the Tail and Tail+1 positions of completion table 205 to multiplexer 226. Multiplexer 226 selects the appropriate ITAG (in this case the Base ITAG from the Tail position of completion table 205) by the select input of multiplexer 226 receiving the appropriate value, e.g., 0 or logical value of "1", from latch 225. The selected ITAG by multiplexer 226 may then be stored in latch 227. In one embodiment, completion unit 204 may select the Base IEA in the entry at the Tail position of completion table 205 by inputting the Base IEA from both the Tail and Tail+1 positions of completion table 205 to multiplexer 228. Multiplexer 228 selects the appropriate IEA (in this case the Base IEA from the Tail position of completion table 205) by the select input of multiplexer 228 receiving the appropriate value, e.g., 0 or logical value of "1", from latch 223. The selected ITAG by multiplexer 228 may then be stored in latch 229.

In step 318, completion unit 204 calculates the address offset. In one embodiment, completion unit 204 calculates the address offset by subtracting the selected Base ITAG from the ITAG of the next to complete instruction calculated in step 314 or 315. In one embodiment, completion unit 204 calculates the address offset by subtractor 230 subtracting the selected Base ITAG from the ITAG of the next to complete instruction calculated in step 314 or 315. The address offset may then be stored in latch 231.

In step 319, completion unit 204 calculates the effective address of the next to complete instruction. In one embodiment, completion unit 204 calculates the effective address of the next to complete instruction by adding the address offset calculated in step 318 with the selected Base IEA. In one embodiment, completion unit 204 calculates the effective address of the next to complete instruction by adder 232 adding the address offset calculated in step 318 with the selected Base IEA. The effective address of the next to complete instruction may then be stored in latch 233.

Upon calculating the effective address of the next to complete instruction, then instruction fetch unit 201 fetches another instruction in step 301. It is noted that instruction fetch unit 201 may fetch the next instruction during or after the completion of any step in method 300 and that fetching upon calculating the effective address of the next to complete instruction is illustrative.

Returning to step 316, if the selected instruction is not older than the instruction corresponding to the first of a consecutive number of outstanding instructions in the "Tail+1" position of completion table, then in step 320, completion unit 204 selects the Base ITAG and Base IEA in the entry at the Tail+1 position of completion table 205. If the selected instruction is not older than the instruction corresponding to the first of a consecutive number of outstanding instructions in the "Tail+1" position of completion table 205, then the selected instruction corresponds to one of the instructions represented in the Tail+1 position of completion table 205. In one embodiment, completion unit 204 may select the Base ITAG in the entry at the Tail+1 position of completion table 205 by inputting the Base ITAG from both the Tail and Tail+1 positions of completion table 205 to multiplexer 226. Multiplexer 226 selects the appropriate ITAG (in this case the Base ITAG from the Tail+1 position of completion table 205) by the select input of multiplexer 226 receiving the appropriate value, e.g., 0 or logical value of "1", from latch 225. The selected ITAG by multiplexer 226 may then be stored in latch 227. In one embodiment, completion unit 204 may select the Base IEA in the entry at the Tail+1 position of completion table 205 by inputting the Base EA from both the Tail and Tail+1 positions of completion table 205 to multiplexer 228. Multiplexer 228 selects the appropriate IEA (in this case the Base IEA from the Tail+1 position of completion table 205) by the select input of multiplexer 228 receiving the appropriate value, e.g., 0 or logical value of "1", from latch 223. The selected ITAG by multiplexer 228 may then be stored in latch 229.

In step 321, completion unit 204 calculates the address offset. In one embodiment, completion unit 204 calculates the address offset by subtracting the selected Base ITAG from the ITAG of the next to complete instruction calculated in step 314 or 315. In one embodiment, completion unit 204 calculates the address offset by subtractor 230 subtracting the selected Base ITAG from the ITAG of the next to complete instruction calculated in step 314 or 315. The address offset may then be stored in latch 231.

In step 322, completion unit 204 calculates the effective address of the next to complete instruction. In one embodiment, completion unit 204 calculates the effective address of the next to complete instruction by adding the address offset calculated in step 321 with the selected Base IEA. In one embodiment, completion unit 204 calculates the effective address of the next to complete instruction by adder 232 adding the address offset calculated in step 321 with the selected Base IEA. The effective address of the next to complete instruction may then be stored in latch 233.

In step 323, completion unit 204 deallocates the entry located at the Tail position of completion table 205. Completion unit 204 deallocates the entry located at the Tail position of completion table 205 since all of the consecutive number of instructions represented by that entry have been completed. In one embodiment, logic unit 234 of completion unit 204 deallocates the entry located at the Tail position of completion table 205 upon receipt of an appropriate value, e.g., 0 or logical value of "1", from latch 224.

Upon deallocating the entry located at the Tail position of completion table 205, then instruction fetch unit 201 fetches another instruction in step 301. It is noted that instruction fetch unit 201 may fetch the next instruction during or after the completion of any step in method 300 and that fetching upon deallocating the entry located at the Tail position of completion table 205 is illustrative.

It is noted that using the above described methods to calculate the effective address and indication ("ITAG") of the next to complete instruction for either an in-order or an out-of-order processor may be used to handle exceptions. At the time that an execution unit 211, 212 or 213 finishes execution of an instruction, execution unit 211, 212 or 213 may report that an exception condition exists. Completion unit 204 may then calculate the effective address and indication ("ITAG") of the next to complete instruction for either an in-order or an out-of-order processor using the above described methods. The effective address and ITAG of the next to complete instruction may be saved away as the return effective address and ITAG after the exception condition has been handled.

It is further noted that method 300 may include other and/or additional steps that, for clarity, are not depicted. It is further noted that method 300 may be executed in a different order presented and that the order presented in the discussion of FIGS. 3 and 4 are illustrative. It is further noted that certain steps in method 300 may be executed in a substantially simultaneous manner.

Although the method, completion table and processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A processor comprising a completion table, wherein said completion table comprises:

a plurality of entries, wherein each of said plurality of entries tracks a consecutive number of outstanding instructions, wherein each of said plurality of entries is configured to store an instruction address of a first of said consecutive number of outstanding instructions and an identification of said first of said consecutive number of outstanding instructions;

wherein an instruction address and an identification of a next to complete instruction is calculated using said instruction address of said first of said consecutive number of outstanding instructions and said identification of said first of said consecutive number of outstanding instructions, respectively, in a selected entry of said completion table.

2. The processor as recited in claim 1, wherein said consecutive number of outstanding instructions comprises a length of a cache line.

3. The processor as recited in claim 1, wherein said instruction address is an effective address.

4. The processor as recited in claim 1, wherein said entry is selected based on one of an oldest active instruction and an instruction finished at an execution unit.

5. A method for tracking a larger number of outstanding instructions in a completion table of a processor comprising the steps of:

issuing instructions to a first and a second execution unit;

selecting an identification of one of a finished instruction and an active instruction at one of said first and said second execution unit;

calculating an identification of a next to complete instruction using said selected identification of said one of said finished instruction and said active instruction;

selecting an instruction address and an identification of a first of a consecutive number of outstanding instructions located in an entry of said completion table; and calculating an instruction address of said next to complete instruction using said identification of said next to complete instruction and said selected instruction address and identification of said first of said consecutive number of outstanding instructions located in said entry of said completion table.

6. The method as recited in claim 5 further comprising the step of:

calculating an address offset using said selected identification of said first of said consecutive number of outstanding instructions located in said entry of said completion table and said identification of said next to complete instruction.

7. The method as recited in claim 6, wherein said selected instruction address and identification of said first of said consecutive number of outstanding instructions is selected from an entry located at a tail position of said completion table if said selected instruction is older than a first of a consecutive number of outstanding instructions located in an entry prior to said tail position of said completion table.

8. The method as recited in claim 6, wherein said selected instruction address and identification of said first of said consecutive number of outstanding instructions is selected from an entry located prior to a tail position of said completion table if said selected instruction is not older than a first of a consecutive number of outstanding instructions located in said entry located prior to said tail position of said completion table.

9. The method as recited in claim 8 further comprising the step of:

deallocating an entry located at said tail position of said completion table if said selected instruction is not older than said first of said consecutive number of outstanding instructions located in said entry prior to said tail position of said completion table.

10. The method as recited in claim 6 further comprising the step of:

calculating an instruction address of said next to complete instruction using said calculated address offset and said selected instruction address.

11. The method as recited in claim 10, wherein said instruction address of said next to complete instruction is calculated by adding said calculated address offset to said selected instruction address.

12. The method as recited in claim 5, wherein said selected instruction is a most recently finished instruction at one of said first and said second execution unit.

13. The method as recited in claim 12, wherein said identification of said next to complete instruction is calculated by adding a logical value of one to said identification of said selected instruction.

14. The method as recited in claim 5, wherein said first execution unit is a floating point unit, wherein said second execution unit is a fixed point unit.

15. The method as recited in claim 14, wherein said selected instruction is an instruction finished at said floating point unit if said selected instruction executed at said floating point unit and an instruction executed at said fixed point unit finish at a same time, wherein said identification of said next to complete instruction is calculated by adding a logical value of one to said identification of said selected instruction.

16. The method as recited in claim 14, wherein said selected instruction is an instruction finished at said fixed point unit if there is no instruction finishing at said floating point unit and said selected instruction is older than an oldest active instruction at said floating point unit, wherein said identification of said next to complete instruction is calculated by adding a logical value of one to said identification of said selected instruction.

17. The method as recited in claim 14, wherein said selected instruction is an oldest active instruction at said floating point unit if there is no instruction finishing at said floating point unit and said selected instruction is younger than said oldest active instruction at said floating point unit, wherein a youngest finishing instruction at said fixed point unit is saved, wherein said identification of said next to complete instruction is said identification of said selected instruction.

18. The method as recited in claim 17, wherein said selected instruction is said saved instruction if said oldest active instruction at said floating point unit is finished and there are no older instructions at said floating point unit than said finished oldest active instruction at said floating point unit and if there are no other younger instructions at said fixed point unit, wherein said identification of said next to complete instruction is calculated by adding a logical value of one to said identification of said selected instruction.

19. The method as recited in claim 17, wherein said selected instruction is a youngest finishing instruction at said fixed point unit if said oldest active instruction at said floating point unit is finished and there are no older instructions at said floating point unit than said finished oldest active instruction at said floating point unit and if said youngest finishing instruction at said fixed point unit is younger than said saved instruction, wherein said identification of said next to complete instruction is calculated by adding a logical value of one to said identification of said selected instruction.

20. A processor, comprising:
an instruction fetch unit configured to fetch instructions;
an instruction dispatch unit coupled to said instruction fetch unit, wherein said instruction fetch unit is further configured to issue said fetched instructions to said instruction dispatch unit, wherein said instruction dispatch unit comprises an instruction queue configured to store said fetched instructions;
a first and a second execution unit coupled to said instruction dispatch unit, wherein said dispatch unit is configured to dispatch said stored fetched instructions to said first and said second execution unit; and
a completion unit coupled to said instruction fetch unit, wherein said instruction fetch unit is further configured to issue an instruction address and an identification of each of said fetched instructions to said completion unit, wherein said completion unit is configured to keep track of when said fetched instructions have been completed, wherein said completion unit comprises:
a completion table, wherein said completion table comprises a plurality of entries, wherein each of said plurality of entries tracks a consecutive number of outstanding instructions, wherein each of said plurality of entries is configured to store an instruction address of a first of said consecutive number of outstanding instructions and an identification of said first of said consecutive number of outstanding instructions; wherein said completion unit further comprises:
logic for selecting an identification of one of an instruction finished and an instruction active at one of said first and said second execution unit;
logic for calculating an identification of a next to complete instruction using said identification of said selected instruction;
logic for selecting an instruction address and an identification of a first of a consecutive number of outstanding instructions located in an entry of said completion table; and
logic for calculating an instruction address of said next to complete instruction using said identification of said next to complete instruction and said selected instruction address and identification of said first of said consecutive number of outstanding instructions located in said entry of said completion table.

21. The processor as recited in claim 20, wherein said completion unit further comprises:
logic for calculating an address offset using said selected identification of said first of said consecutive number of outstanding instructions located in said entry of said completion table and said identification of said next to complete instruction.

22. The processor as recited in claim 21, wherein said selected instruction address and identification of said first of said consecutive number of outstanding instructions is selected from an entry located at a tail position of said completion table if said selected instruction is older than a first of a consecutive number of outstanding instructions located in an entry prior to said tail position of said completion table.

23. The processor as recited in claim 21, wherein said selected instruction address and identification of said first of said consecutive number of outstanding instructions is selected from an entry located prior to a tail position of said completion table if said selected instruction is not older than a first of a consecutive number of outstanding instructions located in said entry located prior to said tail position of said completion table.

24. The processor as recited in claim 23, wherein said completion unit further comprises:
logic for deallocating an entry located at said tail position of said completion table if said selected instruction is not older than said first of said consecutive number of outstanding instructions located in said entry prior to said tail position of said completion table.

25. The processor as recited in claim 21, wherein said completion unit further comprises:
logic for calculating an instruction address of said next to complete instruction using said calculated address offset and said selected instruction address.

26. The processor as recited in claim 25, wherein said instruction address of said next to complete instruction is calculated by adding said calculated address offset to said selected instruction address.

27. The processor as recited in claim 20, wherein said selected instruction is a most recently finished instruction at one of said first and said second execution unit.

28. The processor as recited in claim 27, wherein said identification of said next to complete instruction is calculated by adding a logical value of one to said identification of said selected instruction.

29. The processor as recited in claim 20, wherein said first execution unit is a floating point unit, wherein said second execution unit is a fixed point unit.

30. The processor as recited in claim 29, wherein said selected instruction is an instruction finished at said floating point unit if said selected instruction executed at said floating point unit and an instruction executed at said fixed point unit finish at a same time, wherein said identification of said next to complete instruction is calculated by adding a logical value of one to said identification of said selected instruction.

31. The processor as recited in claim 29, wherein said selected instruction is an instruction finished at said fixed point unit if there is no instruction finishing at said floating point unit and said selected instruction is older than an oldest active instruction at said floating point unit, wherein said identification of said next to complete instruction is calculated by adding a logical value of one to said identification of said selected instruction.

32. The processor as recited in claim 29, wherein said selected instruction is an oldest active instruction at said floating point unit if there is no instruction finishing at said floating point unit and said selected instruction is younger than said oldest active instruction at said floating point unit, wherein a youngest finishing instruction at said fixed point unit is saved, wherein said identification of said next to complete instruction is said identification of said selected instruction.

33. The processor as recited in claim 32, wherein said selected instruction is said saved instruction if said oldest active instruction at said floating point unit is finished and there are no older instructions at said floating point unit than said finished oldest active instruction at said floating point unit and if there are no other younger instructions at said fixed point unit, wherein said identification of said next to complete instruction is calculated by adding a logical value of one to said identification of said selected instruction.

34. The processor as recited in claim 32, wherein said selected instruction is a youngest finishing instruction at said fixed point unit if said oldest active instruction at said floating point unit is finished and there are no older instructions at said floating point unit than said finished oldest active instruction at said floating point unit and if said youngest finishing instruction at said fixed point unit is younger than said saved instruction, wherein said identification of said next to complete instruction is calculated by adding a logical value of one to said identification of said selected instruction.

* * * * *